July 26, 1960 C. L. CHRISTIANSEN, JR 2,946,962

TRANSFORMER REDUNDANCY CHECKING CIRCUIT

Filed Nov. 13, 1957

INVENTOR

Carl L. Christiansen, Jr.

BY Sughrue & Rothwell

ATTORNEYS

United States Patent Office 2,946,962
Patented July 26, 1960

2,946,962

TRANSFORMER REDUNDANCY CHECKING CIRCUIT

Carl L. Christiansen, Jr., Poughkeepsie, N.Y., assignor to International Business Machines Corporation, New York, N.Y., a corporation of New York Filed Nov. 13, 1957, Ser. No. 696,132

19 Claims. (Cl. 328—195)

A bistable device such as a trigger, may be given an arbitrary on or off status by definition depending on which side of the trigger is conducting. By convention, a bistable device is identified as on when the left hand side is conducting and thereby driving the left hand side output circuit thereof down. The right hand side output circuit is therefore up since its side is non-conducting. By convention also a bistable device in this condition is considered representative of a binary one. If the status of of the trigger is reversed, that is the right side is down and the left side is up, the trigger by conventional definition is off and representative of binary zero. A plurality of cascaded triggers has an odd or even bit count depending upon the number of on stages. If there are an even number of on stages, then the bit count of the triggers is considered as even. Conversely, if there is an odd number of on stages, the bit count is considered to be odd.

It is therefore an object of this invention to provide a circuit for determining the on or off status of a bistable device.

It is another object of this invention to provide a circuit for determining the odd or even bit count of a register or similar device which includes a plurality of cascaded bistable devices.

Other and further objects of the invention will be apparent from the following description of the accompanying drawings.

Figures 1, 2, 3, 4:
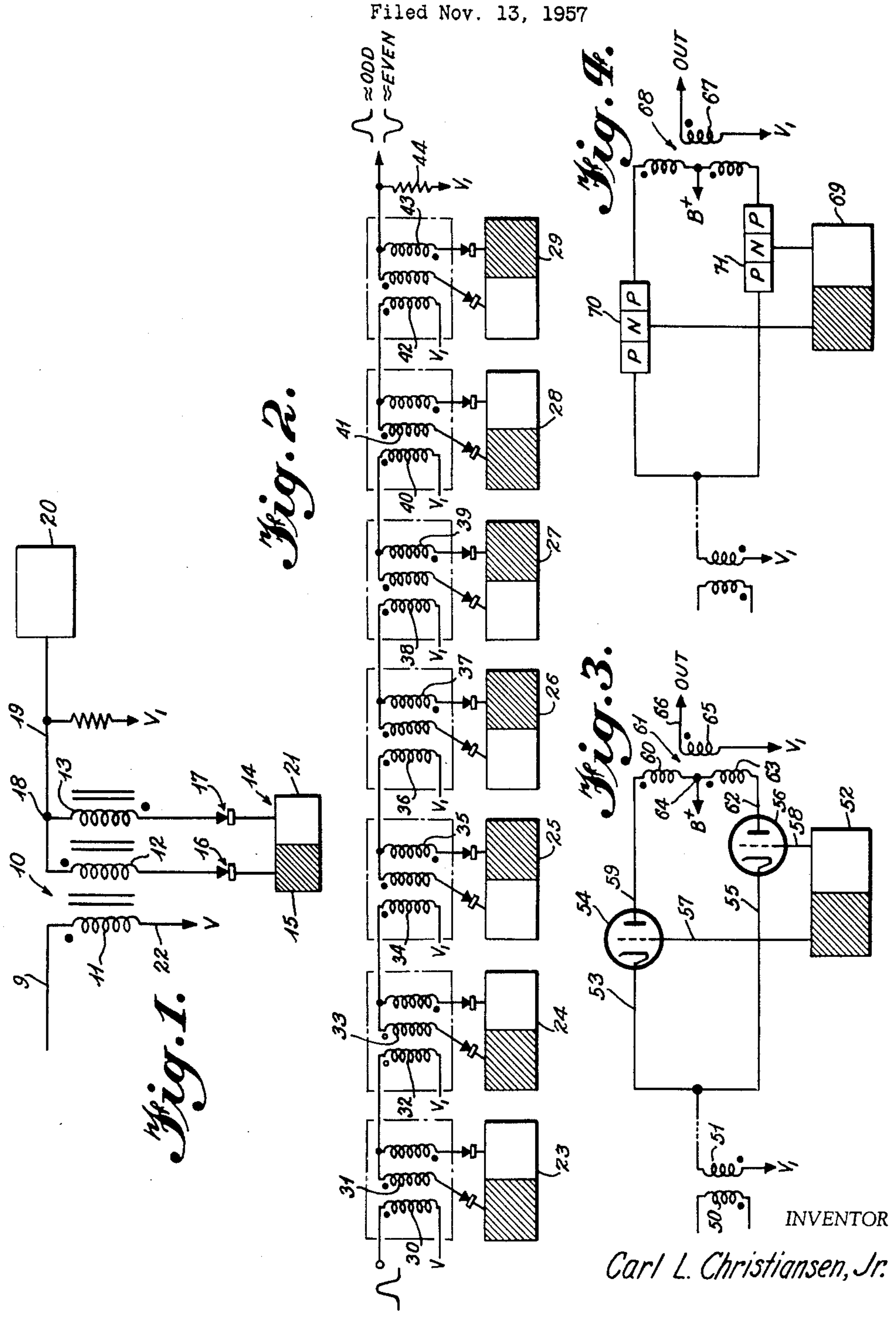
Figure 1 is a diagrammatic illustration of a circuit constructed in accordance with this invention for determining the on or off status of a bistable device.
Figure 2 is a diagrammatic illustration of a series of cascaded bistable devices and circuit means to determine the odd or even bit count of these devices.
Figure 3 is a diagrammatic illustration of another embodiment of the circuit of Figure 1.
Figure 4 is a diagrammatic illustration of still another embodiment of the circuit of Figure 1.

Referring first to Figure 1, there is shown a circuit for determining the on or off status of a single bistable device. A three winding transformer 10 is provided having a primary winding 11, a first secondary winding 12 and a second secondary winding 13. The dots are added to show the relative phase relation between the windings as determined by their physical positioning on the transformer core. The primary winding 11 and the secondary winding 12 are wound so that a signal in primary 11 will induce a signal in secondary 12 which is in-phase therewith. The secondary 13 is wound with relation to the primary 11 so that a signal in 11 produces a signal in 13 which is out-of-phase therewith to obtain a polarity inversion of the signal to the primary. Consequently, the output from the secondary circuit of transformer 11 will be in-phase or out-of-phase with the input to the primary depending upon which secondary is responsible for the output signal.

Numeral 14 indicates a single bistable device such as a trigger. This trigger is shown as having a left side 15 and a right side 21. For purposes of illustration, the shading of side 15 indicates that it is conducting and that its output circuit is low. The right side thereof is non-conducting or high. The condition of this trigger under these circumstances is representative of a binary one. The trigger is considered to be on. One terminal of secondary 12 is connected to diode 16. One terminal of secondary 13 is connected to diode 17. The other two terminals of secondary 12 and 13 are joined at a common output point 18. An output lead 19 is connected to point 18 and provides an input signal from the secondary circuit to a polarity detector indicated as 20.

It will be noted that the diodes are illustrated according to convention, the arrow portion thereof indicating the direction of possible current flow. The arrow portion indicates the plate electrodes of the diodes and the other portion of the diodes designates the cathode electrodes thereof. These diodes may be of the tube type or semiconductor type.

The cathode electrodes of the diodes are connected to the trigger 14. The cathode of diode 16 is connected to the left side of trigger 14 and more specifically to the output circuit thereof. In a conventional vacuum tube trigger, this means that this cathode electrode would be connected to the plate circuit of the left side tube of the trigger. The cathode of diode 17 is connected similarly to the right side of trigger 14.

Lead 9 of primary 11 is the input signal lead. The other lead 22 is connected to a D.C. source indicated as V. V is preferably of a potential in the arrangement illustrated such as to insure linearity of operation of the transformer. Voltage $V_1$ is supplied to both secondaries 12 and 13. The voltage of $V_1$ is chosen so that when a side of the trigger 14 is conducting its corresponding diode will be forward biased. Therefore $V_1$ is chosen so as to be slightly positive with respect to the potential of the cathode electrode of the diode connected to the output circuit of the conducting side of trigger 14. It is, then, slightly positive in potential with respect to the output voltage level of the output circuit of the conducting side. V and $V_1$ may be of the same potential and from the same source.

A pulse supplied to primary 11 via input lead 9 finds diode 16 conducting through winding 12 placing winding 12 effectively at A.C. ground. Diode 17 is cut off due to the fact that it is connected to the non-conducting side of trigger 14 thereby causing winding 13 to be effectively floated through the high back resistance of diode 17. Therefore, the pulse supplied to primary 11 will induce an output pulse in secondary 12 which output pulse will be in-phase with the input to primary 11. The output signal appears on lead 19. This output is fed through lead 19 to the polarity detector 20 which indicates in any conventional manner the phase of the output with relation to the input. In this particular arrangement, the detector will indicate an in-phase output which means that the trigger 14 is on and thereby indicative of a binary one.

The diodes 16 and 17 can be connected in the opposite direction to that shown in Figure 1. In this event, the diode that is connected to the high side of the trigger will conduct while the diode connected to the down side will not conduct. $V_1$ will then be chosen so as to provide a D.C. potential slightly negative with respect to the output voltage level of the output circuit of the non-conducting side of the trigger. Under these conditions, an in-phase output will represent a trigger that is off (binary zero) and an out-of-phase output will represent a trigger that is on (binary 1). It should also be noted that it is preferred that the turns ratio of windings 11, 12 and 13 be 1:1:1, although a different ratio can be chosen as desired.

It can be seen, then, that depending on which side of the trigger is conducting, only one winding is operatively connected to the input primary in the sense that said operatively connected winding provides and determines the phase of the output pulse resulting from the pulse to the input winding.

Figure 2 represents a register or similar device including a plurality of cascaded triggers 23, 24, 25, 26, 27, 28 and 29. Voltages V and $V_1$ are chosen in the same manner as indicated with respect to Figure 1. Let us now assume that triggers 23, 24 and 28 are on, indicating binary one storage in these three triggers, and consequently an odd count in the register. A pulse applied to primary 30 will induce an in-phase output on secondary 31. This output is fed to primary 32 of trigger 24. This induces an in-phase signal in secondary 33 since trigger 24 is on. This in-phase signal from secondary 33 is fed to primary 34. Since this trigger 25 is off, an out-of-phase signal appears in secondary 35. This out-of-phase signal is fed to the primary 36 of trigger 26 which is off. Consequently, an in-phase signal appears in secondary 37 which is fed to the primary 38. Trigger 27 is also off and consequently an out-of-phase signal appears in secondary 39. This out-of-phase signal is fed to primary 40 and since trigger 28 is on, an out-of-phase signal appears in secondary 41. This input signal is fed to primary 42 and since trigger 29 is off, an in-phase signal appears in secondary 43. The signal in secondary 43 when related back to the input signal to primary 30 is in-phase therewith, and appears across resistor 44 which is connected to $V_1$. Since it is in-phase as determined by a polarity detector fed by the output from secondary 43 (not shown), the bit count of the register is determined as odd. If the situation was that an even number of the triggers was on, it can be seen that the output to the polarity detector would be out-of-phase with the input to primary 30 and thereby indicative of an even bit count in the register.

Here, again, the diodes may be reversed in polarity and $V_1$ chosen accordingly. In this case an in-phase output indicates an even count and an out-of-phase output indicates an odd count.

Figure 3 represents another embodiment of this invention. Numeral 50 indicates the primary winding of an input transformer and 51 the secondary thereof. One terminal of the secondary is connected to a potential source $V_1$ which is negative with respect to B+. The other terminal of the secondary is connected to cathode 53 of tube 54 and to cathode 55 of tube 56. Tubes 54 and 56 are arranged to function as grounded grid amplifiers. The grid 57 of tube 54 is connected to the output circuit of the left side of trigger 52 and grid 58 of tube 56 is connected to the output circuit of the right side of the trigger. Plate 59 of tube 54 is connected to one side of primary 60 of transformer 61. Plate 62 of tube 56 is connected to one side of primary 63 of transformer 61. The other ends of primary 60 and 63 are connected at point 64. Plate voltage B+ is fed to this junction point 64. Secondary 65 of transformer 61 is fed by potential $V_1$ at one end and provides an output on lead 66 at the other end. A polarity detector (not shown) receives the output from secondary 65 and compares it to the signal fed to primary 50 of the input transformer.

Again the dots represent relative phase directions of the various windings. With trigger 52 in its on condition, grid 57 is low and grid 58 is high. $V_1$ is chosen so as to be less than B+ but greater than the voltage of the grid connected to the conducting side of the trigger and less than the voltage of the grid connected to the non-conducting side of the trigger. Therefore tube 54 is cut-off and tube 56 is conducting. A positive pulse supplied to primary 50 of the input transformer will induce a positive pulse in secondary 51. The secondary pulse will be fed to cathodes 53 and 55. Tube 54 will be unaffected. The bias on tube 56 will become more negative and may even cut-off. This produces a positive swing of plate 62 and a positive pulse in primary winding 63 of transformer 61. This positive swing will induce a positive voltage swing in the secondary 65 since it is wound in the same direction as primary 63. Had the trigger been in the off status, a positive swing of plate 59 of tube 54 would have resulted and the secondary 65 of transformer 61 would have produced a negative voltage swing. Therefore as shown here, phase reversal between input and output indicates an off trigger. No phase reversal indicates an on trigger. By proper selection of $V_1$ and winding direction of primaries and secondaries, phase reversal can indicate an on trigger and no phase reversal can indicate an off trigger.

Although Figure 3 illustrates a vacuum tube circuit employing triodes, other multi-element tubes may be used. For instance, pentodes may be employed in which the input signal from the secondary of the input transformer may be connected to the control grids and the connections from the output circuits of both sides of the trigger may be made to the suppressor grids or possibly the screen grids of these pentodes.

Figure 4 illustrates a grounded base type of semi-conductor amplifier. It is the substantial transistor equivalent of the vacuum tube circuit of Figure 3. An output from secondary 67 of transformer 68 with no polarity inversion with relation to the input to the circuit indicates that trigger 69 is on. With polarity inversion, trigger 69 is indicated as off. Although the transistors 70 and 71 are indicated diagrammatically as the junction type, other types such as the point contact type may be used.

The circuits of Figures 3 and 4 may also be used to determine the odd or even bit count of a plurality of cascaded triggers. In the embodiments of Figures 3 and 4 conventional R.C. input coupling may be used in place of the input transformers.

What is claimed is:

1. A circuit for determining the on or off status of a bistable device, said device having a first side thereof conducting and a second side thereof non-conducting comprising; a first circuit means and a second circuit means, input means for feeding an input signal to both of said circuit means, means to connect said first circuit means and said second circuit means to opposite sides of said bistable device, whereby only one of said circuit means is operatively connected to said input means, one of said circuit means being adapted to produce an output signal therefrom out-of-phase with said input signal and the other of said circuit means being adapted to produce an output signal therefrom in-phase with said input signal and means to determine the phase of an output signal from said operatively connected circuit means with relation to said input signal as an indication of the status of said bistable device.

2. A circuit for determining the on or off status of a bistable device, said device having a first side thereof conducting and a second side thereof non-conducting comprising a first circuit means and a second circuit means, input means for feeding an input signal to both of said circuit means, means to connect said first circuit means and said second circuit means to the output circuit of opposite sides of said bistable device, whereby only one of said circuit means is operatively connected to said input means, one of said circuit means being adapted to produce an output signal therefrom out-of-phase with said input signal and the other of said circuit means being adapted to produce an output signal therefrom in-phase with said input signal and means to determine the phase of an output signal from said operatively connected circuit means with relation to said input signal as an indication of the status of said bistable device.

3. A circuit for determining the on or off status of a bistable device, said device having a first side thereof conducting and a second side thereof non-conducting comprising a transformer having an input primary winding, a first secondary winding wound in the same direction as said primary winding and a second secondary winding wound in the opposite direction to said primary winding, said first secondary winding being adapted to produce an output signal therefrom in-phase with an input signal to said primary winding and said second secondary winding being adapted to produce an output signal therefrom out-of-phase with an input signal to said primary winding, a first circuit means including said first secondary winding and a second circuit means including said second secondary winding connected to opposite sides of said bistable device, whereby only one of said circuit means is operatively connected to said input primary winding of said transformer and means to determine the phase of an output signal from said operatively connected circuit means with relation to an input signal to said input primary winding as an indication of the status of said bistable device.

4. A circuit for determining the on or off status of a bistable device, said device having a first side thereof conducting and a second side thereof non-conducting, comprising a transformer having an input primary winding, a first secondary winding wound in the same direction as said primary winding and a second secondary winding wound in the opposite direction to said primary winding, said first secondary winding being adapted to produce an output signal therefrom in-phase with an input signal to said primary winding and said second secondary winding being adapted to produce an output signal therefrom out-of-phase with an input signal to said primary winding, a first unidirectional current conducting element having one electrode connected to one end of said first secondary winding, a second unidirectional current conducting element having one electrode connected to one end of said second secondary winding, means to connect the other ends of said secondary windings together to provide an output circuit for said secondaries, means to connect the other electrode of said unidirectional current conducting elements to opposite sides of said bistable device, whereby only one of said secondary windings is operatively connected to said input primary winding of said transformer and means connected to said output circuit for said secondary windings to determine the phase of an output signal from said operatively connected secondary winding with relation to an input signal to said primary winding as an indication of the status of said bistable device.

5. A circuit as defined by claim 4 wherein both of said unidirectional current conducting elements are polarized in the same direction.

6. A circuit as defined by claim 5 wherein said unidirectional current conducting elements are connected to the output circuits of the respective sides of said bistable device.

7. A circuit as defined in claim 4 further including a source of D.C. potential and means to connect said source to said secondary windings.

8. A circuit as defined by claim 7 wherein the potential of said source is slightly positive with respect to the potential of the output circuit of the conducting side of said bistable device.

9. A circuit for determining the odd or even bit count of a plurality of series connected bistable devices, each of said devices having a first side thereof conducting and a second side thereof non-conducting comprising; a signal input means and a signal output means associated with each of said bistable devices, means to connect the output signal means associated with each of said bistable devices to the said input signal means associated with the next succeeding bistable device in the series, each of said output signal means including a first and a second circuit means, means to connect each of said first and second circuit means to opposite sides of their associated bistable device, whereby only one of said circuit means associated with each of said bistable devices is operatively connected to the input signal means associated with the first of said bistable devices in said series, one of said circuit means associated with each bistable device being adapted to produce an output signal therefrom out-of-phase with the input signal to its associated input signal means and the other of said circuit means associated with each bistable device being adapted to produce an output signal therefrom in-phase with the input signal to its associated input signal means and means to determine the phase of the output signal from the output signal means associated with the last bistable device in said series with relation to an input signal to the input signal means associated with the first bistable device in said series as an indication of the odd or even bit count of said series of bistable devices.

10. A circuit as defined by claim 9 wherein each of said signal input means comprises a primary winding of a transformer and each of said first and second circuit means includes a separate secondary winding of said transformer.

11. A circuit as defined by claim 10 further including a unidirectional current conducting element in each of said first and second circuit means.

12. A circuit as defined by claim 11 wherein each of said unidirectional current conducting elements are polarized in the same direction.

13. A circuit as defined by claim 12 wherein each of said secondary windings and its associated unidirectional current conducting element is connected in series and each of said unidirectional current conducting elements is connected to the output circuit of opposite sides of its associated bistable device.

14. A circuit as defined by claim 13 further including a source of D.C. potential and means to connect said source to said secondary windings.

15. A circuit as defined by claim 14 wherein the potential of said source is slightly positive with respect to the potential of the output circuit of the conducting side of said bistable device.

16. A circuit for determining the on or off status of a bistable device, said device having a first side thereof conducting and a second side thereof non-conducting comprising; a first circuit means and a second circuit means, input means for feeding an input signal to both of said circuit means, a source of D.C. potential, means to connect one portion of each of said first and second circuit means to opposite sides of said bistable device, means to connect another portion of said first and second circuit means to said source, whereby only one of said circuit means is operatively connected to said input means, one of said circuit means being adapted to produce an output signal therefrom out-of-phase with said input signal and the other of said circuit means being adapted to produce an output signal therefrom in-phase with said input signal and means connected to said first and second circuit means to determine the phase of an output signal from said operatively connected circuit means with relation to said input signal as an indication of the status of said bistable device.

17. A circuit as defined by claim 16 wherein said D.C. source has a potential which is positive with relation to the voltage of that portion of said circuit means connected to the conducting side of said bistable device.

18. A circuit for determining the on or off status of a bistable device comprising; a first circuit means and a second circuit means, input means for feeding an input signal to both of said circuit means, means to connect said first circuit means and said second circuit means to opposite sides of said bistable device, whereby only one of said circuit means is operatively connected to said input means, one of said circuit means being adapted to produce an output signal therefrom out-of-phase with said input signal and the other of said circuit means being adapted to produce an output signal therefrom in-phase with said input signal and means to determine the phase of an output signal from said operatively connected circuit means with relation to said input signal as an indication of the status of said bistable device.

19. A circuit for determining the on or off status of a bistable device, said device having a first side thereof conducting and a second side thereof nonconducting, comprising; a first circuit means and a second circuit means, input means for feeding an input signal of the same polarity to both of said circuit means, means to connect said first circuit means and said second circuit means to opposite sides of said bistable device, whereby only one of said circuit means is operatively connected to said input means, one of said circuit means being adapted to produce an output signal therefrom out-of-phase with said input signal and the other of said circuit means being adapted to produce an output signal therefrom in-phase with said input signal and means to determine the phase of an output signal from said operatively connected circuit means with relation to said input signal as an indication of the status of said bistable device.

References Cited in the file of this patent

UNITED STATES PATENTS

| | | |
|---|---|---|
| 2,615,127 | Edwards | Oct. 21, 1952 |
| 2,641,696 | Woolard | June 9, 1953 |
| 2,819,394 | Gordon | Jan. 7, 1958 |